US009463569B1

(12) United States Patent
Douglas

(10) Patent No.: US 9,463,569 B1
(45) Date of Patent: Oct. 11, 2016

(54) HANDLE GRIPPING SYSTEM HAVING INNER RIDGES AND CHANNELS

(71) Applicant: Richard Douglas, Tucson, AZ (US)

(72) Inventor: Richard Douglas, Tucson, AZ (US)

(*) Notice: Subject to any disclaimer, the term of this patent is extended or adjusted under 35 U.S.C. 154(b) by 0 days.

(21) Appl. No.: 14/815,599

(22) Filed: Jul. 31, 2015

Related U.S. Application Data

(63) Continuation-in-part of application No. 14/326,809, filed on Jul. 9, 2014, now Pat. No. 9,095,971, which is a continuation-in-part of application No. 13/715,731, filed on Dec. 14, 2012, now Pat. No. 8,800,112.

(60) Provisional application No. 61/576,685, filed on Dec. 16, 2011.

(51) Int. Cl.
*A47J 45/00* (2006.01)
*B25G 3/32* (2006.01)
*B25G 1/10* (2006.01)
*B25G 1/02* (2006.01)

(52) U.S. Cl.
CPC ............. *B25G 1/102* (2013.01); *B25G 1/02* (2013.01)

(58) Field of Classification Search
CPC .. A63B 49/08; A63B 53/14; A63B 59/0014; B62K 21/12; B62K 21/26; A01K 87/08; A46B 5/021; B25G 1/00; B25G 1/10; B25G 1/102; B25G 1/105; B25G 1/125; B25G 1/02
USPC ......... 16/421, 422, 428, 430, 431, 435, 413, 16/DIG. 12; 294/171, 15, 102.1, 102.2, 294/137, 132; 74/551.9; 15/144.1, 144.2, 15/144.3, 143.1, 145
See application file for complete search history.

(56) References Cited

U.S. PATENT DOCUMENTS

| | | | | |
|---|---|---|---|---|
| 1,876,993 A | * | 9/1932 | Manning | B62D 1/06 16/DIG. 12 |
| 2,984,486 A | * | 5/1961 | Jones | A63B 59/70 16/421 |
| 3,072,955 A | | 1/1963 | Mitchell | |
| 3,981,043 A | * | 9/1976 | Curry | B25G 1/06 15/154.2 |
| 4,332,119 A | | 6/1982 | Toews | |
| 4,563,381 A | | 1/1986 | Woodland | |
| 4,670,938 A | | 6/1987 | Fowlston | |
| 4,799,727 A | | 1/1989 | Robbins et al. | |
| 4,885,820 A | | 12/1989 | Erceg et al. | |
| 5,015,028 A | | 5/1991 | Bonnett | |
| 5,056,945 A | | 10/1991 | Klodt | |
| 5,083,825 A | | 1/1992 | Bystrom et al. | |

(Continued)

FOREIGN PATENT DOCUMENTS

JP 08090979 A * 4/1996

*Primary Examiner* — Chuck Mah

(57) ABSTRACT

Gripping stability and comfort to a user is provided by a gripping system for a handle. A gripping wrap utilizes friction ridges and relief grooves. The gripping wrap has first barrels disposed on a wrap edge and second barrels disposed on an opposing wrap edge. Between each barrel are disposed gaps that separate the barrels such that the barrels and gaps are alternatingly disposed on the wrap edges. The gripping wrap is disposed on and flexibly covers at least a portion of a handle exterior surface. A shim member is disposed between the gripping wrap and the handle to fill in gaps. Barrels from one wrap edge are aligned with gaps on the opposing wrap edge such that each barrel fits in its corresponding gap. A binding component is slidably inserted through a barrel channel of each barrel to secure and retain the gripping wrap on the handle.

20 Claims, 5 Drawing Sheets

(56) References Cited

U.S. PATENT DOCUMENTS

| | | | |
|---|---|---|---|
| 5,105,594 A | 4/1992 | Kirchner | |
| 5,195,212 A * | 3/1993 | Colwell | B25G 1/10 16/421 |
| 5,348,360 A | 9/1994 | Mencarelli et al. | |
| 5,511,445 A | 4/1996 | Hildebrandt | |
| 5,890,260 A * | 4/1999 | Gaunt | B25G 1/10 16/436 |
| 6,006,403 A | 12/1999 | Battiato | |
| 6,065,764 A * | 5/2000 | Moseley | B62B 5/06 150/154 |
| 6,148,482 A | 11/2000 | Maraman, Jr. | |
| 6,234,924 B1 | 5/2001 | Washburn, Jr. | |
| 6,235,134 B1 | 5/2001 | Mueller | |
| 6,974,626 B2 | 12/2005 | Horacek | |
| 7,232,352 B2 * | 6/2007 | Splaine | B63H 16/04 440/101 |
| 7,669,291 B1 | 3/2010 | Blum | |
| 7,861,380 B2 | 1/2011 | Moore et al. | |
| 8,276,626 B2 * | 10/2012 | Balbosa | B62B 5/06 150/154 |
| 8,650,715 B2 * | 2/2014 | Sonnendorfer | B41F 23/0403 16/421 |
| 8,800,112 B1 | 8/2014 | Douglas | |
| 2004/0050205 A1 | 3/2004 | Putnam | |
| 2011/0232038 A1 | 9/2011 | Miller | |

* cited by examiner

HANDLE GRIPPING SYSTEM HAVING INNER RIDGES AND CHANNELS

CROSS REFERENCE

This application is a continuation-in-part and claims benefit of U.S. patent application Ser. No. 14/326,809, filed Jul. 9, 2014, which is a continuation-in-part and claims benefit of U.S. patent application Ser. No. 13/715,731 filed Dec. 14, 2012, which is a non-provisional and claims benefit of U.S. Provisional Patent Application No. 61/576,685 filed Dec. 16, 2011, the specification(s) of which is/are incorporated herein in their entirety by reference.

FIELD OF THE INVENTION

The present invention relates to grips, in particular, grips for handles.

BACKGROUND OF THE INVENTION

Various embodiments of grips have been used on handles to aid to a user in holding, carrying, pushing, pulling, guiding or steering an object. Grips can wear out over time and are not easily replaceable due to the difficulty of obtaining the correct replacement for the application. Sometimes makeshift grips are used, but if the grip is not specified or installed correctly, the makeshift grip can lead to discomfort, operational problems, or safety hazards when used. The present invention provides a solution for a new or replacement gripping system for a handle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The subject disclosure features a gripping system for a handle. The gripping system may comprise the handle, a gripping wrap, and a binding means. An embodiment of gripping wrap utilizes raised friction ribs and the relief gripping grooves. The gripping wrap has loops and slots that line up as the grip is wrapped around an object. The locking rod is then slidably inserted through the loops and is held in place by an abducting force from the grip. The gripping wrap has an elastic property which allows it to be stretched slightly to apply the locking rod. The loop portion is then positioned to fit ergonomically within the groove of the thumb and first digit for ease and stability. A shim can be placed between the gripping wrap and the handle for a secure fit. An application tool may be used to assist the person applying the grip in that it gently applies force to the gripping wrap to bring the loops uniformly together and allowing easy application of the locking rod.

One embodiment of the present invention features a gripping system for a handle adapted to provide gripping stability and comfort to a user. The system may comprise a cylindrical handle having a handle exterior surface, an elastomeric flexible gripping wrap, and a binding component.

In some embodiments, the elastomeric flexible gripping wrap may comprise an elongated planar wrap top surface, an elongated planar wrap bottom surface, a wrap first edge, a wrap second edge, a wrap third edge opposed to the wrap first edge, and a wrap fourth edge opposed to the wrap second edge. The gripping wrap may further comprise a plurality of outwardly protruding ridges arranged in rows longitudinally disposed on the wrap bottom surface from the wrap first edge to the wrap third edge. A plurality of inwardly protruding channels longitudinally may also be disposed on the wrap bottom surface from the wrap first edge to the wrap third edge.

In one embodiment, the gripping wrap may further comprise a plurality of first barrels linearly disposed on the wrap second edge. Each of the first barrels may have a first barrel channel disposed therein and that are parallel with the wrap second edge. Between each first barrel are disposed one or more first gaps that separate the first barrels such that the first barrels and first gaps are alternatingly disposed on the wrap second edge.

In another embodiment, a plurality of second barrels may be linearly disposed on the wrap fourth edge of the gripping wrap. Each second barrel may have a second barrel channel disposed therein and parallel with the wrap fourth edge. Between each second barrel are disposed one or more second gaps that separate the second barrels such that the second barrels and second gaps are alternatingly disposed on the wrap fourth edge.

Preferably, the gripping wrap may be disposed on and flexibly covers at least a portion of the handle exterior surface. In some embodiments, the first barrels are aligned with the second gaps such that each first barrel fits in its corresponding second gap, and the second barrels are aligned with the first gaps such that each second barrel fits in its corresponding first gap. The binding component may be slidably inserted and disposed through each first barrel channel and each second barrel channel to secure and retain the gripping wrap on the handle.

In some embodiments, the system may further comprise a shim member for filling a third gap between the gripping wrap and the handle in order to provide a snug fit. Preferably, the shim member is disposed on and flexibly covers at least a portion of the handle exterior surface. The gripping wrap may be disposed on and flexibly covers at least a portion of the shim member. The shim member is adapted to provide a shim underneath the gripping wrap so that the gripping system for the handle can provide gripping stability and comfort for a user.

DESCRIPTION OF PREFERRED EMBODIMENTS

Figure 1:
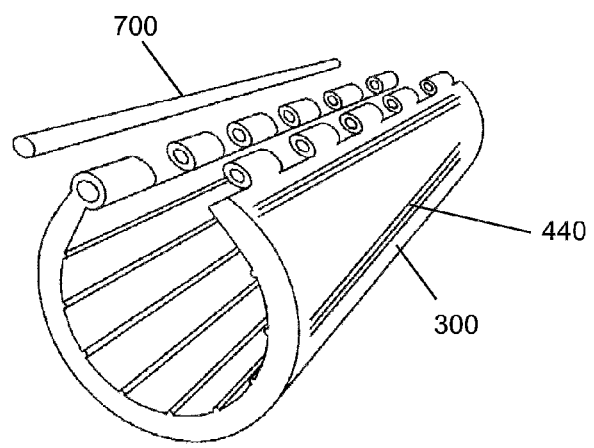
FIG. 1 shows a perspective view of a gripping wrap and a binding component of the present invention. The gripping wrap is in a partially wrapped position.
Figure 2:
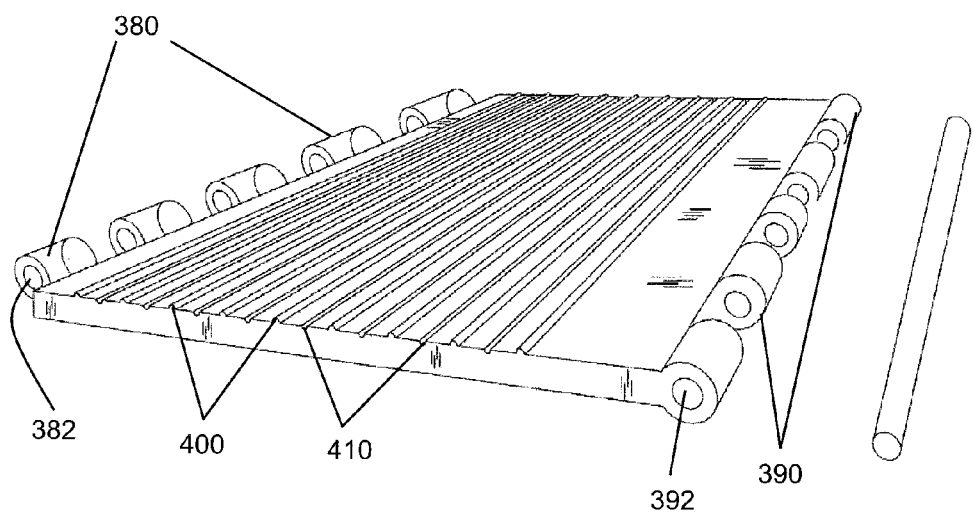
FIG. 2 shows a perspective view of the gripping wrap and the binding component of the present invention.
Figure 3:
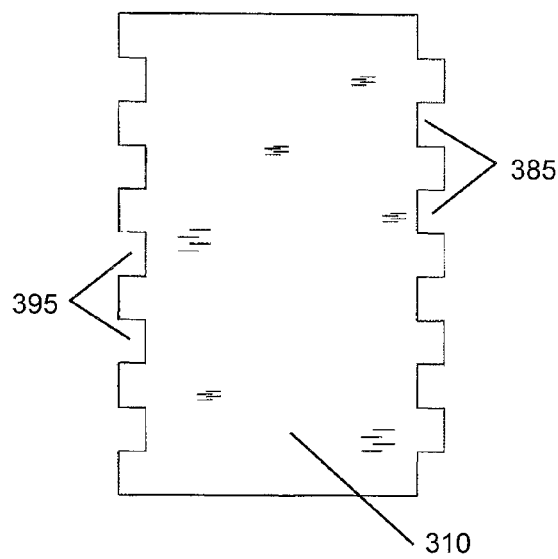
FIG. 3 shows a bottom view of the gripping wrap.
Figure 4:
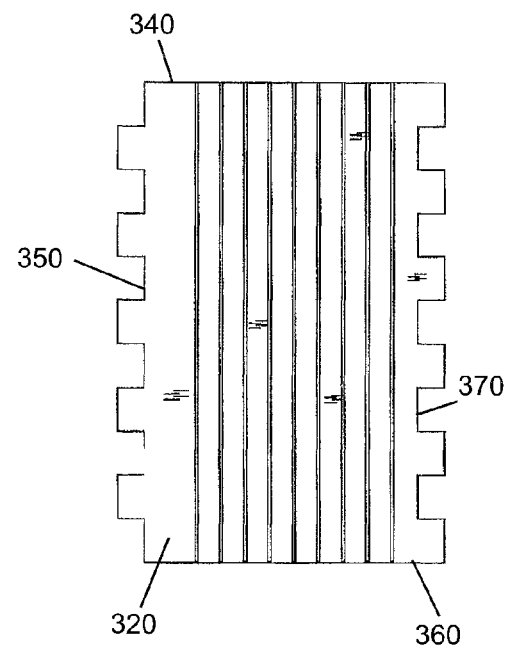
FIG. 4 shows a top view of the gripping wrap.
Figure 5:
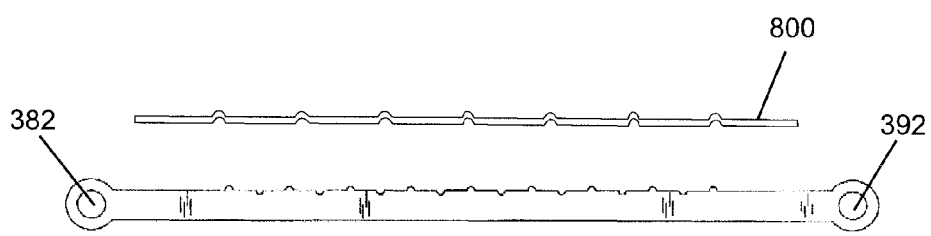
FIG. 5 shows a front side view of the gripping wrap with the shimming component.
Figure 6:
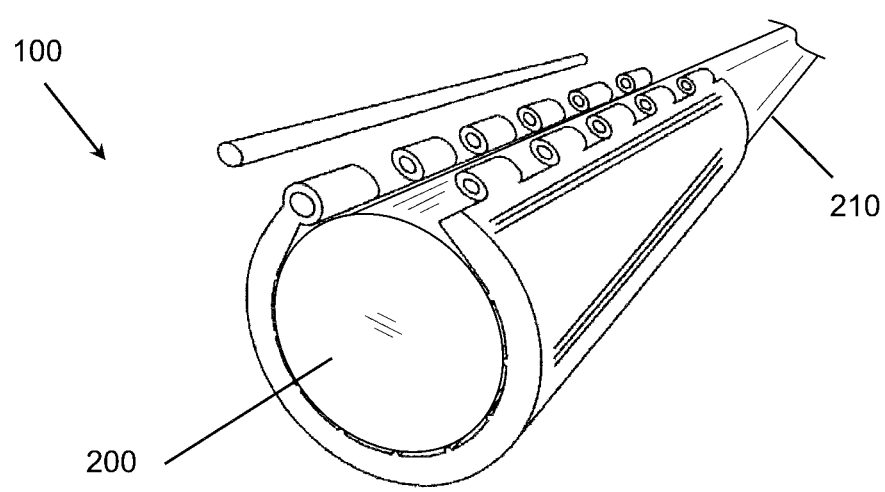
FIG. 6 shows an in-use perspective view of the gripping wrap and the binding component of the present invention. The gripping wrap is partially wrapped around a cylindrical bar.
Figure 7A:
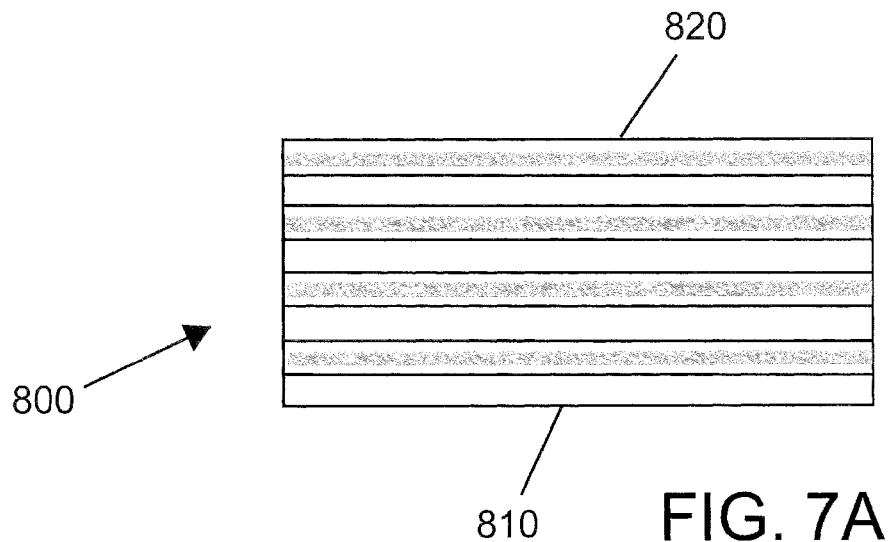
FIG. 7A is a top view of the shim member of the present invention.
Figure 7B:
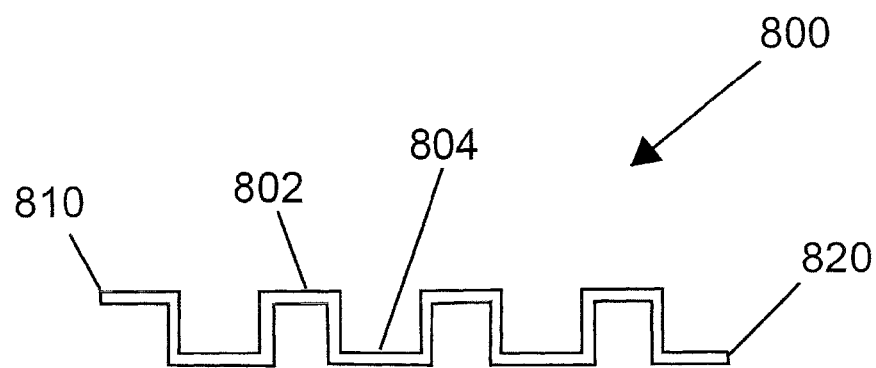
FIG. 7B is a cross-sectional view in a transverse plane of the shim member of the present invention.
Figure 7C:
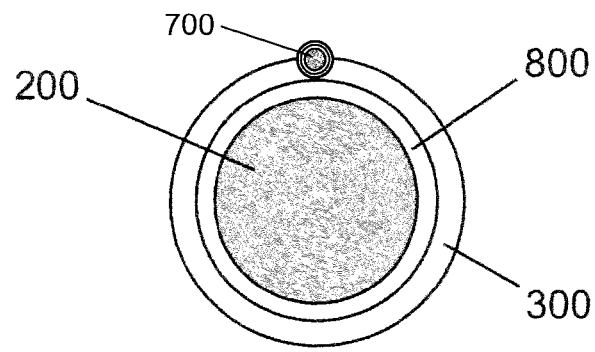
FIG. 7C is a cross-sectional view in a transverse plane of the present invention.

Following is a list of elements corresponding to a particular element referred to herein:
- 100 Gripping system
- 200 Handle
- 210 Handle exterior surface
- 300 Gripping wrap
- 310 Wrap top surface
- 320 Wrap bottom surface
- 340 Wrap first edge
- 350 Wrap second edge
- 360 Wrap third edge
- 370 Wrap fourth edge
- 380 First barrel
- 382 First barrel channel
- 385 First gap
- 390 Second barrel
- 392 Second barrel channel
- 395 Second gap
- 400 Ridge
- 410 Channel
- 440 Gripping aid
- 700 Rod
- 800 Shim member
- 802 Shim ridges
- 804 Shim channels
- 810 Shim member first edge
- 820 Shim member second edge Referring now to FIGS. 1-8, the present invention features a gripping system (100) for a handle (200). The gripping system (100) for the handle (200) is adapted to provide gripping stability and comfort to a user. In some embodiments, the system (100) may comprise a cylindrical handle (200) having a handle exterior surface (210), an elastomeric flexible gripping wrap (300), and a binding component (700).

In some embodiments, the elastomeric flexible gripping wrap (300) may comprise an elongated planar wrap top surface (310), an elongated planar wrap bottom surface (320), a wrap first edge (340), a wrap second edge (350), a wrap third edge (360) opposed to the wrap first edge (340), and a wrap fourth edge (370) opposed to the wrap second edge (350). The gripping wrap (300) may further comprise a plurality of outwardly protruding ridges (400) arranged in rows longitudinally disposed on the wrap bottom surface (320) from the wrap first edge (340) to the wrap third edge (360). A height of each ridge (400) protrudes outwardly from a plane of said wrap bottom surface (320). A plurality of inwardly protruding channels (410) longitudinally may also be disposed on the wrap bottom surface (320) from the wrap first edge (340) to the wrap third edge (360). A depth of each channel (410) protrudes inwardly from the plane of said wrap bottom surface (320).

In one embodiment, the gripping wrap (300) may further comprise a plurality of first barrels (380) linearly disposed on the wrap second edge (350). Each of the first barrels (380) may have a first barrel channel (382) disposed therein and that are parallel with the wrap second edge (350). As used herein, the term "barrel" is defined as a hollow structure having opens ends fluidly connected by a channel. Between each first barrel (380) are disposed one or more first gaps (385) that separate the first barrels (380) such that the first barrels (380) and first gaps (385) are alternatingly disposed on the wrap second edge (350).

In another embodiment, a plurality of second barrels (390) may be linearly disposed on the wrap fourth edge (370) of the gripping wrap (300). Each second barrel (390) may have a second barrel channel (392) disposed therein and parallel with the wrap fourth edge (370). Between each second barrel (390) are disposed one or more second gaps (395) that separate the second barrels (390) such that the second barrels (390) and second gaps (395) are alternatingly disposed on the wrap fourth edge (370).

Preferably, the gripping wrap (300) may be disposed on and flexibly covers at least a portion of the handle exterior surface (210). In some embodiments, the first barrels (380) are aligned with the second gaps (395) such that each first barrel (380) fits in its corresponding second gap (395), and the second barrels (390) are aligned with the first gaps (385) such that each second barrel (390) fits in its corresponding first gap (385). The binding component (700) may be slidably inserted and disposed through each first barrel channel (382) and each second barrel channel (392) to secure and retain the gripping wrap (300) on the handle (200).

In some embodiments, the plurality of first barrels (380) may comprise about 2 to 10 first barrels. In other embodiments, the plurality of first barrels (380) may comprise at least 10 first barrels. In some embodiments, the one or more first gaps (385) may comprise about 1 to 10 first gaps. In other embodiments, the one or more first gaps (385) may comprise at least 10 first gaps. In some embodiments, the plurality of second barrels (390) may comprise about 2 to 10 second barrels. In other embodiments, the plurality of second barrels (390) may comprise at least 10 second barrels. In some embodiments, the one or more second gaps (395) may comprise about 1 to 10 second gaps. In other embodiments, the one or more second gaps (395) may comprise at least 10 second gaps. For example, the number of first barrels is equal to 'X' and the number of first gaps is equal to Y, then the number of second barrels is equal to 'Y' and the number of second gaps is equal to 'X'. In one embodiment, the number 'X' is not equal to 'Y'. In another embodiment, the numbers 'X' and 'Y' are equal. In some embodiments, the first barrels and the second barrels may have a length of between about ¼" to 1". In other embodiments, the first barrels and the second barrels may have a length greater than about 1". Preferably, the first gaps and second gaps have a length equal to or greater than the lengths of the first and second barrels so that the first and second barrels can snugly fit in their respective gaps.

In some embodiments, the binding component (700) is a cylindrical rod. The cylindrical rod may have a diameter slightly smaller than a diameter of the barrel channels to snugly fit through each barrel channel. In other embodiments, the binding component may have a length that is less than or equal to a length of the wrap second edge (350) or wrap fourth edge (370).

In some embodiments, the system (100) may further comprise a shim member (800) for filling a third gap between the gripping wrap (300) and the handle (200) in order to provide a snug fit. The shim member (800) may comprise a plurality of outwardly protruding shim ridges (802) and alternately inwardly protruding shim channels (804) disposed opposite the shim ridges (802), and further arranged in rows longitudinally disposed on the shim member (800) from a shim member first edge (810) to a shim member second edge (820). Preferably, the shim member (800) is disposed on and flexibly covers at least a portion of the handle exterior surface (210). When the shim member (800) is when wrapped around the handle (200), the shim member second edge (820) may overlappingly wrap over the shim member first edge (810). The gripping wrap (300) may be disposed on and flexibly covers at least a portion of the shim member (800). The shim member (800) is adapted to provide a shim underneath the gripping wrap (300) so that the gripping system (100) for the handle (200) can provide gripping stability and comfort for a user.

Figure 8:
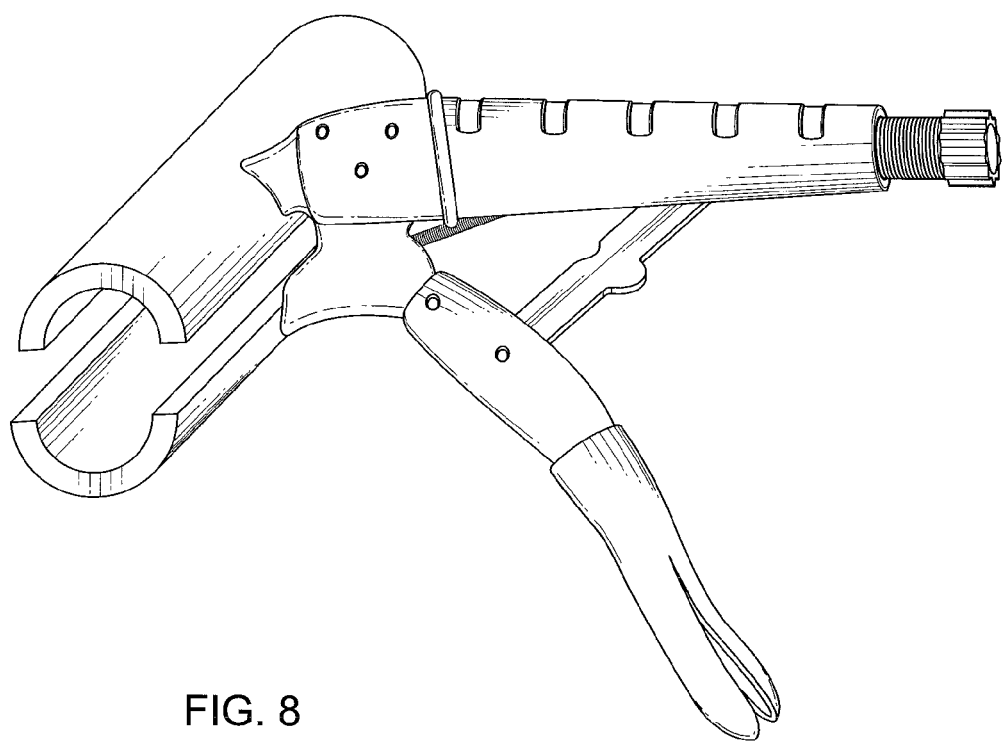
FIG. 8 shows an exemplary embodiment of an application tool for installing the present invention.

In other embodiments, an application tool, such as that shown in FIG. 8, may be used to easily install the gripping wrap (300) on the handle (200). The application tool can position the gripping wrap upon the handle such that the barrel channels are in alignment to allow for the ease of sliding the binding component through the barrel channels.

An additional embodiment of the present invention may feature a gripping system (100) for a handle (200) that comprises the handle (200) having a handle exterior surface (210), a flexible gripping wrap (300), and a binding component (700). The gripping system (100) for the handle (200) is adapted to provide gripping stability and comfort to a user.

In some embodiments, the flexible gripping wrap (300) may comprise a planar wrap top surface (310), a planar wrap bottom surface (320), a wrap first edge (340), a wrap second edge (350), a wrap third edge (360) opposed to the wrap first edge (340), and a wrap fourth edge (370) opposed to the wrap second edge (350). The gripping wrap may further comprise a plurality of outwardly protruding ridges (400) arranged in rows longitudinally disposed on the wrap bottom surface (320) from the wrap first edge (340) to the wrap third edge (360), and a plurality of inwardly protruding channels (410) longitudinally disposed on the wrap bottom surface (320) from the wrap first edge (340) to the wrap third edge (360).

In one embodiment, one or more first barrels (380) may be linearly disposed on the wrap second edge (350). One or more first gaps (385) may separate the first barrels (380) such that the first barrels (380) and first gaps (385) are alternatingly disposed on the wrap second edge (350). In another embodiment, one or more second barrels (390) may be linearly disposed on the wrap fourth edge (370). One or more second gaps (395) may separate the second barrels (390) such that the second barrels (390) and second gaps (395) are alternatingly disposed on the wrap fourth edge (370).

Preferably, the gripping wrap (300) is disposed on and flexibly covers at least a portion of the handle exterior surface (210). In some embodiments, the first barrels (380) are aligned with the second gaps (395) such that each first barrel (380) fits in its corresponding second gap (395), and the second barrels (390) are aligned with the first gaps (385) such that each second barrel (390) fits in its corresponding first gap (385). The binding component (700) is slidably inserted and disposed through the first barrels (380) and the second barrels (390) to secure and retain the gripping wrap (300) on the handle (200).

In one embodiment, the binding component may be an elongated rod or bar sufficiently sized to snugly fit through the barrel channels. In another embodiment, the binding component may be in the shape of a cylinder, a rectangular prism, a triangular prism, or a flat bar. The barrel channels can have a cross-sectional shape corresponding to that of the binding component. In an alternative embodiment, the binding component may comprise one or more sub-components. For example, the binding component may comprise two sub-components having a summed length equal to the length of the wrap second edge (350) or wrap fourth edge (370). One of the sub-components may be inserted through the barrel channels from the wrap first edge (340), and the other sub-component may be inserted may be inserted through the barrel channels from the wrap third edge (360). This can allow for ease of insertion of the sub-components when the gripping wrap is relatively lengthy such that the friction makes it difficult to slidably insert only one binding component.

In some embodiments, the system (100) further comprises a shim member (800) for filling a third gap between the gripping wrap (300) and the handle (200). The shim member (800) may comprise a plurality of outwardly protruding shim ridges (802) arranged in rows longitudinally disposed on the shim member (800) from a shim member first edge (810) to a shim member second edge (820). In another embodiment, the shim member (800) may further comprise a plurality of inwardly protruding shim channels (804) alternating with the shim ridges (802), and further arranged in rows longitudinally disposed on the shim member (800) from a shim member first edge (810) to a shim member second edge (820).

Preferably, the shim member (800) is disposed on and flexibly covers at least a portion of the handle exterior surface (210), and the gripping wrap (300) is disposed on and flexibly covers at least a portion of the shim member (800). The shim member (800) is adapted to provide a shim underneath the gripping wrap (300) so that the gripping system (100) for the handle (200) may provide gripping stability and comfort for a user.

A further embodiment of the present invention features a gripping system (100) for a handle (200) that consists of a cylindrical handle (200) with a handle exterior surface (210), an elastomeric flexible gripping wrap (300), and a binding component (700). The gripping system (100) for the handle (200) is adapted to provide gripping stability and comfort to a user.

In one embodiment, the elastomeric flexible gripping wrap (300) may consists of an elongated planar wrap top surface (310), an elongated planar wrap bottom surface (320), a wrap first edge (340), a wrap second edge (350), a wrap third edge (360) opposed to the wrap first edge (340), a wrap fourth edge (370) opposed to the wrap second edge (350), a plurality of outwardly protruding ridges (400) arranged in rows longitudinally disposed on the wrap bottom surface (320) from the wrap first edge (340) to the wrap third edge (360), a plurality of inwardly protruding channels (410) longitudinally disposed on the wrap bottom surface (320) from the wrap first edge (340) to the wrap third edge (360), a plurality of first barrels (380) linearly disposed on the wrap second edge (350), and a plurality of second barrels (390) linearly disposed on the wrap fourth edge (370).

In one embodiment, a depth of each of said channels (410) protrude inwardly from the plane of said wrap bottom surface (320), and a height of each of said ridges (400) protrude outwardly from a plane of said wrap bottom surface (320). In another embodiment, a first barrel channel (382) is disposed through each first barrel (380) and is parallel with the wrap second edge (350). One or more first gaps (385) may separate the first barrels (380) such that the first barrels (380) and first gaps (385) are alternatingly disposed on the wrap second edge (350). In still a further embodiment, a second barrel channel (392) is disposed through each second barrel (390) and is parallel with the wrap fourth edge (370). One or more second gaps (395) may separate the second barrels (390) such that the second barrels (390) and second gaps (395) are alternatingly disposed on the wrap fourth edge (370).

Preferably, the gripping wrap (300) is disposed on and flexibly covers at least a portion of the handle exterior surface (210). The first barrels (380) are aligned with the second gaps (395) such that each first barrel (380) fits in its corresponding second gap (395), and the second barrels (390) are aligned with the first gaps (385) such that each second barrel (390) fits in its corresponding first gap (385). The binding component (700) is slidably inserted and disposed through each first barrel channel (382) and each second barrel channel (392) to secure and retain the gripping wrap (300) on the handle (200).

Alternate Embodiment of the System Featuring Cylindrical Pockets.

In some embodiments, the gripping wrap (300) comprises a plurality of cylindrical pockets located on the wrap second edge (350) and a plurality of cylindrical pockets located on the wrap fourth edge (370). In some embodiments, a first aperture is centrally located on a flat cylindrical pocket first end and a second aperture is centrally located on a flat pocket second end. In some embodiments, the first aperture is fluidly connected to the second aperture through the cross section of the cylindrical pocket. In some embodiments the plurality of cylindrical pockets located on the wrap second edge (350) and the plurality of cylindrical pockets located on the wrap fourth edge (370) are offset from one another, so that when the gripping wrap (300) is rolled into a cylindrical shape (around the handle (200)), the plurality of cylindrical pockets on the wrap second edge (350) align with the cylindrical pockets on the wrap fourth edge (370) so that a locking rod may slidably pass through the first aperture and second aperture of each sequential cylindrical pocket. In some embodiments, the gripping wrap (300) is located on and flexibly covers at least a portion of the handle exterior surface (210). In some embodiments, the wrap bottom surface (320) is adapted to wrap around at least a portion of and contact the handle exterior surface (210).

Alternate Embodiment of the System Featuring Bulges and a Binding Component.

In some embodiments, the system (100) comprises an elastomeric flexible gripping wrap (300) having an elongated planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350).

In some embodiments, the gripping wrap (300) comprises a plurality of outwardly protruding ridges (400) arranged in rows longitudinally located on the wrap bottom surface (320) from the wrap first edge (340) to the wrap third edge (360), and the height of each of the ridges (400) protruding outwardly from the plane of the wrap bottom surface (320).

In some embodiments, the gripping wrap (300) comprises a plurality of inwardly protruding channels (410) longitudinally located on the wrap bottom surface (320) from the wrap first edge (340) to the wrap third edge (360), and the depth of each of the channels (410) protruding inwardly from the plane of the wrap bottom surface (320).

In some embodiments, the gripping wrap (300) comprises a first linear bulge located on the wrap second edge (350). In some embodiments, the first linear bulge runs at least partial a length of the wrap second edge (350). In some embodiments, the gripping wrap (300) comprises a second linear bulge located on the wrap fourth edge (370). In some embodiments, the second linear bulge runs at least partial a length of the wrap fourth edge (370).

In some embodiments, the first linear bulge or the second linear bulge is cylindrical. In some embodiments, the first linear bulge or the second linear bulge is angular. In some embodiments, the first linear bulge is a first attachment component and the second linear bulge is a second attachment component.

In some embodiments, the gripping wrap (300) comprises a first attachment component disposed on the wrap second edge (350). In some embodiments, the first attachment component runs at least partial a length of the wrap second edge (350).

In some embodiments, the gripping wrap (300) comprises a second attachment component disposed on the wrap fourth edge (370). In some embodiments, the second attachment component runs at least partial a length of the wrap fourth edge (370).

In some embodiments, the system (100) comprises a linear binding component having a binding component first edge and a binding component second edge. In some embodiments, an open first pocket is located on the binding component first edge and an open second pocket is located on the binding component second edge. In some embodiments, the first pocket faces outward. In some embodiments, the second pocket faces outward opposed to the first pocket. In some embodiments, the first pocket is complementary to the structure of the first linear bulge and the second pocket is complementary to the structure of the second linear bulge. In some embodiments, the linear binding component is concave on a bottom surface and convex on a top surface.

In some embodiments, the gripping wrap (300) is located on and flexibly covers at least a portion of the handle exterior surface (210). In some embodiments, the first linear bulge is inserted into the first pocket and the second linear bulge is inserted into the second pocket such that the first pocket wraps around and encases the first linear bulge and the second pocket wraps around and encases the second linear bulge. In some embodiments, the gripping wrap (300) is secured via the binding component.

In some embodiments, the system (100) further comprises a shim member (800). In some embodiments, the shim member (800) comprises a plurality of outwardly protruding ridges (400) and alternately inwardly protruding channels, arranged in rows longitudinally located on the shim member (800) from a shim member first edge (810) to a shim member second edge (820). In some embodiments, the channels (410) are located opposite the ridges (400).

In some embodiments, the shim member first edge (810) comprises a partial ridge (400) located thereon. In some embodiments, the opposing shim member second edge (820) comprises a partial channel (410) located thereon. In some embodiments, the shim member (800), when wrapped, comprises overlapping edges. In some embodiments, the shim member second edge (820) overlaps and wraps over the shim member first edge (810).

In some embodiments, the shim member (800) is located on and flexibly covers at least a portion of the handle exterior surface (210). In some embodiments, the gripping wrap (300) is located on and flexibly covers at least a portion of the shim member (800). In some embodiments, the shim member (800) is adapted to provide a shim underneath the gripping wrap (300). In some embodiments, the gripping system (100) for the handle (200) is adapted to provide gripping stability and comfort for a user.

Alternate Embodiment of the System Featuring First and Second Recessed Ledges.

In some embodiments, the gripping system (100) comprises a cylindrical handle (200) having a handle exterior surface (210). In some embodiments, the system (100) comprises a flexible gripping wrap (300) having a wrap top surface (310), a wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350). In some embodiments, the gripping wrap (300) comprises a plurality of outwardly protruding ridges (400) located on the wrap bottom surface (320) from the wrap first edge (340) to the wrap third edge (360). In some embodiments, the gripping wrap (300) comprises a plurality of inwardly protruding channels (410) located on the wrap bottom surface (320) from the wrap first edge (340) to the wrap third edge (360).

In some embodiments, the gripping wrap (300) comprises a first recessed ledge located on an intersection of the wrap top surface (310) and the wrap second edge (350). In some embodiments, the gripping wrap (300) comprises a second recessed ledge located at an intersection of the wrap bottom surface (320) and the wrap fourth edge (370). In some embodiments, the gripping wrap (300) is located on and flexibly covers at least a portion of the handle exterior surface (210). In some embodiments, the second recessed ledge is adapted to overlay and interfaceably attach to the first recessed ledge. In some embodiments, the gripping system (100) for the handle (200) is adapted to provide gripping stability and comfort for a user.

In some embodiments, the gripping wrap (300) comprises a first projection located on an intersection of the wrap top surface (310) and the wrap second edge (350). In some embodiments, the gripping wrap (300) comprises a second projection located at an intersection of the wrap bottom surface (320) and the wrap fourth edge (370). In some embodiments, the gripping wrap (300) is located on and flexibly covers at least a portion of the handle exterior surface (210). In some embodiments, the wrap bottom surface (320) having the first projection is adapted to wrap around at least a portion of and contact the handle exterior surface (210). In some embodiments, the second projection is adapted to slidably insert underneath the first projection against the handle (200) sliding past a first projection ledge and be held into place via tension interlocking a second projection ledge against the first projection ledge. In some embodiments, a cross-section of the first projection and the second projection comprises a first planar side, a second planar side, and a third radial side. In some embodiments, the first planar side is the first projection ledge or the second projection ledge.

In some embodiments, the first recessed ledge comprises an adhesive component located thereon. In some embodiments, the second recessed ledge comprises an adhesive component located thereon. In some embodiments, the first recessed ledge comprises a magnetic component located thereon. In some embodiments, the second recessed ledge comprises a magnetic component located thereon.

Alternate Embodiment of the System Featuring a Binding Component.

In some embodiments, the system has a gripping wrap (or a sheet) with a wrap top surface (or a sheet top surface), a wrap bottom surface (or a sheet bottom surface) with a friction enhancing interface, a wrap first edge, a wrap second edge with a second edge connecting member, a wrap third edge, and a wrap fourth edge with a fourth edge connecting member. In some embodiments, the system further has a binding component with a binding component first edge and a binding component second edge.

In some embodiments, the gripping wrap is wrapped around a handle, where the binding component first edge slides into or onto the second edge connecting member, and the binding component second edge slides into or onto the fourth edge connecting member. The gripping wrap is held into place around the handle via the binding component. In some embodiments, the friction enhancing interface has one or more ridges. In some embodiments, the friction enhancing interface has one or more grooves.

In some embodiments, the second edge connecting member has a generally round cross-section. In some embodiments, the second edge connecting member has a generally polygonal cross-section. In some embodiments, the second edge connecting member has a generally arrow-shaped cross-section. In some embodiments, the second edge connecting member has a generally one-half arrow-shaped cross section.

In some embodiments, the second edge connecting member has a generally flat mating surface. In some embodiments, the second edge connecting member has an adhesive component. In some embodiments, the second edge connecting member has a magnetic component.

In some embodiments, the fourth edge connecting member has a generally round cross-section. In some embodiments, the fourth edge connecting member has a generally polygonal cross-section. In some embodiments, the fourth edge connecting member has a generally arrow-shaped cross-section. In some embodiments, the fourth edge connecting member has a generally one-half arrow-shaped cross section.

In some embodiments, the fourth edge connecting member has a generally flat mating surface. In some embodiments, the fourth edge connecting member has an adhesive component. In some embodiments, the fourth edge connecting member has a magnetic component.

In some embodiments, the binding component first edge has a first side complementary receiving member to receive the second edge connecting member. In some embodiments, the first side complementary receiving member has a hollow channel that slidably attaches to the second edge connecting member. In some embodiments, the hollow channel mates to the second edge connecting member.

In some embodiments, the binding component second edge has a second side complementary receiving member to receive the fourth edge connecting member. In some embodiments, the second side complementary receiving member has a hollow channel that slidably attaches to the fourth edge connecting member. In some embodiments, the hollow channel mates to fourth edge connecting member.

Additional features for any embodiment of the present invention are further described herein.

In some embodiments, the gripping wrap is generally rectangular. In some embodiments, the gripping wrap is polygonal, for example, hexagonal. In some embodiments, the gripping wrap can be trimmed to fit. In some embodiments, the gripping wrap can be shrunk upon application of a heat source. In some embodiments, the gripping wrap has a thickness less that a ¼". In some embodiments, the gripping wrap has a thickness from ¼" to ½".

In some embodiments, the gripping wrap is constructed from a rubber or silicone rubber. In some embodiments, the gripping wrap is constructed from a polymeric material, such as plastics. In some embodiments, the gripping wrap is constructed from a spongy material. In some embodiments, the gripping wrap is constructed from a pliable material. In some embodiments, the gripping wrap is constructed from an elastic material. In some embodiments, the gripping wrap is constructed from an elastomeric material. In some embodiments, the gripping wrap is constructed from a foam.

In some embodiments, the wrap top surface has a gripping aid. In some embodiments, the wrap bottom surface has a gripping aid. In some embodiments, the gripping aid has ridges. In some embodiments, the gripping aid has channels. In some embodiments, the gripping aid has a textured surface. In some embodiments, the gripping aid has an embossed surface. In some embodiments, the gripping aid has a raised surface. In some embodiments, the gripping aid interfaces with the hand of the user. In some embodiments, the wrap bottom surface comprises an adhesive component located thereon. The adhesive component provides additional binding of the gripping wrap to the handle.

In some embodiments, the binding component is constructed from a rubber. In some embodiments, the binding component is constructed from a plastic. In some embodiments, the binding component is constructed from a metal. Preferably, the binding component has a sufficiently smooth exterior surface for ease of movement, such as sliding.

In some embodiments, the shim member is rectangular. In other embodiments, the shim member is circular or polygonal, i.e. triangular or hexagonal. In still other embodiments, the shim member (800) is constructed from a rubber, a silicon rubber, a polymer, or a foam. In some embodiments, the shim member may comprise a plurality shims, such 2 or more shims. In other embodiments, the shim member is sized to be less than or equal to the size of the gripping wrap. In still further embodiments, the shim member may have a thickness less than ¼" or less than ½".

In some embodiments, the length of the wrap second edge is less than 6". In some embodiments, the length of the wrap second edge is between 6" and 12". In some embodiments, the length of the wrap second edge is between 12" and 24". In some embodiments, the length of the wrap second edge is greater than 24".

In some embodiments, the length of the wrap fourth edge is less than 6". In some embodiments, the length of the wrap fourth edge is between 6" and 12". In some embodiments, the length of the wrap fourth edge is between 12" and 24". In some embodiments, the length of the wrap fourth edge is greater than 24".

In some embodiments, the width of the gripping wrap measured from the wrap second edge to the wrap fourth edge is less than 6". In some embodiments, the width of the gripping wrap measured from the wrap second edge to the wrap fourth edge is between 6" and 12". In some embodiments, the width of the gripping wrap measured from the wrap second edge to the wrap fourth edge is between 12" and 24". In some embodiments, the width of the gripping wrap measured from the wrap second edge to the wrap fourth edge is greater than 24".

As used herein, the term "about" refers to plus or minus 10% of the referenced number. For example, an embodiment wherein the handle is about 10 inches in length includes a handle that is between 9 and 11 inches in length.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A gripping system (100) for a handle (200), wherein said system (100) comprises:
   a. a cylindrical handle (200) having a handle exterior surface (210);
   b. an elastomeric flexible gripping wrap (300) comprising:
      i. an elongated planar wrap top surface (310);
      ii. an elongated planar wrap bottom surface (320);
      iii. a wrap first edge (340), a wrap second edge (350), a wrap third edge (360) opposed to the wrap first edge (340), and a wrap fourth edge (370) opposed to the wrap second edge (350),
      iv. a plurality of outwardly protruding ridges (400) arranged in rows longitudinally disposed on the wrap bottom surface (320) from the wrap first edge (340) to the wrap third edge (360), wherein a height of each of said ridges (400) protrude outwardly from a plane of said wrap bottom surface (320);
      v. a plurality of inwardly protruding channels (410) longitudinally disposed on the wrap bottom surface (320) from the wrap first edge (340) to the wrap third edge (360), wherein a depth of each of said channels (410) protrude inwardly from the plane of said wrap bottom surface (320);
      vi. a plurality of first barrels (380) linearly disposed on the wrap second edge (350), each first barrel (380) having a first barrel channel (382) disposed therein and parallel with the wrap second edge (350), wherein one or more first gaps (385) separate the first barrels (380) such that the first barrels (380) and first gaps (385) are alternatingly disposed on the wrap second edge (350); and
      vii. a plurality of second barrels (390) linearly disposed on the wrap fourth edge (370), each second barrel (390) having a second barrel channel (392) disposed therein and parallel with the wrap fourth edge (370), wherein one or more second gaps (395) separate the second barrels (390) such that the second barrels (390) and second gaps (395) are alternatingly disposed on the wrap fourth edge (370); and
   c. a binding component (700);
   wherein the gripping wrap (300) is disposed on and flexibly covers at least a portion of the handle exterior surface (210), wherein the first barrels (380) are aligned with the second gaps (395) such that each first barrel (380) fits in its corresponding second gap (395), wherein the second barrels (390) are aligned with the first gaps (385) such that each second barrel (390) fits in its corresponding first gap (385), wherein the binding component (700) is slidably inserted and disposed through each first barrel channel (382) and each second barrel channel (392) to secure and retain the gripping wrap (300) on the handle (200);

wherein the gripping system (100) for the handle (200) is adapted to provide gripping stability and comfort to a user.

2. The system (100) of claim 1, wherein the gripping wrap (300) is rectangular.

3. The system (100) of claim 1, wherein the gripping wrap (300) is constructed from a rubber, a silicon rubber, a polymer, or a foam.

4. The system (100) of claim 1, wherein the wrap top surface (310) comprises a gripping aid (440).

5. The system (100) of claim 4, wherein the gripping aid (440) comprises a textured surface.

6. The system (100) of claim 1, wherein the binding component (700) is a cylindrical rod.

7. The system (100) of claim 1, wherein the wrap bottom surface (320) comprises an adhesive component disposed thereon.

8. The system (100) of claim 1, wherein the system (100) further comprises a shim member (800) for filling a third gap between the gripping wrap (300) and the handle (200), wherein the shim member (800) comprises a plurality of outwardly protruding shim ridges (802) and alternately inwardly protruding shim channels (804) arranged in rows longitudinally disposed on the shim member (800) from a shim member first edge (810) to a shim member second edge (820), wherein the shim channels (804) are disposed opposite the shim ridges (802);

wherein the shim member (800) is disposed on and flexibly covers at least a portion of the handle exterior surface (210), wherein the gripping wrap (300) is disposed on and flexibly covers at least a portion of the shim member (800), wherein when the shim member (800) is when wrapped around the handle (200), the shim member second edge (820) overlappingly wraps over the shim member first edge (810);

wherein the shim member (800) is adapted to provide a shim underneath the gripping wrap (300), wherein the gripping system (100) for the handle (200) is adapted to provide gripping stability and comfort for a user.

9. The system (100) of claim 8, wherein the shim member (800) is rectangular.

10. The system (100) of claim 8, wherein the shim member (800) is constructed from a rubber, a silicon rubber, a polymer, or a foam.

11. A gripping system (100) for a handle (200), wherein said system (100) consisting of:
  a. a handle (200) having a handle exterior surface (210);
  b. a flexible gripping wrap (300) consisting of:
    i. a planar wrap top surface (310);
    ii. a planar wrap bottom surface (320);
    iii. a wrap first edge (340), a wrap second edge (350), a wrap third edge (360) opposed to the wrap first edge (340), and a wrap fourth edge (370) opposed to the wrap second edge (350),
    iv. a plurality of outwardly protruding ridges (400) arranged in rows longitudinally disposed on the wrap bottom surface (320) from the wrap first edge (340) to the wrap third edge (360);
    v. a plurality of inwardly protruding channels (410) longitudinally disposed on the wrap bottom surface (320) from the wrap first edge (340) to the wrap third edge (360);
    vi. one or more first barrels (380) linearly disposed on the wrap second edge (350), wherein one or more first gaps (385) separate the first barrels (380) such that the first barrels (380) and first gaps (385) are alternatingly disposed on the wrap second edge (350); and
    vii. one or more second barrels (390) linearly disposed on the wrap fourth edge (370), wherein one or more second gaps (395) separate the second barrels (390) such that the second barrels (390) and second gaps (395) are alternatingly disposed on the wrap fourth edge (370); and
  c. a binding component (700);
    wherein the gripping wrap (300) is disposed on and flexibly covers at least a portion of the handle exterior surface (210), wherein the first barrels (380) are aligned with the second gaps (395) such that each first barrel (380) fits in its corresponding second gap (395), wherein the second barrels (390) are aligned with the first gaps (385) such that each second barrel (390) fits in its corresponding first gap (385), wherein the binding component (700) is slidably inserted and disposed through the first barrels (380) and the second barrels (390) to secure and retain the gripping wrap (300) on the handle (200);
    wherein the gripping system (100) for the handle (200) is adapted to provide gripping stability and comfort to a user.

12. The system (100) of claim 11, wherein the gripping wrap (300) is rectangular.

13. The system (100) of claim 11, wherein the gripping wrap (300) is constructed from a rubber, a silicon rubber, a polymer, or a foam.

14. The system (100) of claim 11, wherein the wrap top surface (310) comprises a gripping aid (440).

15. The system (100) of claim 14, wherein the gripping aid (440) comprises a textured surface.

16. The system (100) of claim 11, wherein the wrap bottom surface (320) comprises an adhesive component disposed thereon.

17. The system (100) of claim 11, wherein the system (100) further comprises a shim member (800) for filling a third gap between the gripping wrap (300) and the handle (200), wherein the shim member (800) comprises a plurality of outwardly protruding shim ridges (802) arranged in rows longitudinally disposed on the shim member (800) from a shim member first edge (810) to a shim member second edge (820);

wherein the shim member (800) is disposed on and flexibly covers at least a portion of the handle exterior surface (210), wherein the gripping wrap (300) is disposed on and flexibly covers at least a portion of the shim member (800);

wherein the shim member (800) is adapted to provide a shim underneath the gripping wrap (300), wherein the gripping system (100) for the handle (200) is adapted to provide gripping stability and comfort for a user.

18. The system (100) of claim 17, wherein the shim member (800) is rectangular.

19. The system (100) of claim 17, wherein the shim member (800) is constructed from a rubber, a silicon rubber, a polymer, or a foam.

20. A gripping system (100) for a handle (200), wherein said system (100) comprises:
- a. a cylindrical handle (200) having a handle exterior surface (210);
- b. an elastomeric flexible gripping wrap (300) comprising:
  - i. an elongated planar wrap top surface (310);
  - ii. an elongated planar wrap bottom surface (320);
  - iii. a wrap first edge (340), a wrap second edge (350), a wrap third edge (360) opposed to the wrap first edge (340), and a wrap fourth edge (370) opposed to the wrap second edge (350),
  - iv. a plurality of outwardly protruding ridges (400) arranged in rows longitudinally disposed on the wrap bottom surface (320) from the wrap first edge (340) to the wrap third edge (360), wherein a height of each of said ridges (400) protrude outwardly from a plane of said wrap bottom surface (320);
  - v. a plurality of inwardly protruding channels (410) longitudinally disposed on the wrap bottom surface (320) from the wrap first edge (340) to the wrap third edge (360), wherein a depth of each of said channels (410) protrude inwardly from the plane of said wrap bottom surface (320);
  - vi. a one or more first barrels (380) linearly disposed on the wrap second edge (350), each first barrel (380) having a first barrel channel (382) disposed therein and parallel with the wrap second edge (350), wherein one or more first gaps (385) separate the first barrels (380) such that the first barrels (380) and first gaps (385) are alternatingly disposed on the wrap second edge (350); and
  - vii. a one or more second barrels (390) linearly disposed on the wrap fourth edge (370), each second barrel (390) having a second barrel channel (392) disposed therein and parallel with the wrap fourth edge (370), wherein one or more second gaps (395) separate the second barrels (390) such that the second barrels (390) and second gaps (395) are alternatingly disposed on the wrap fourth edge (370); and
- c. a binding component (700);

wherein the gripping wrap (300) is disposed on and flexibly covers at least a portion of the handle exterior surface (210), wherein the first barrels (380) are aligned with the second gaps (395) such that each first barrel (380) fits in its corresponding second gap (395), wherein the second barrels (390) are aligned with the first gaps (385) such that each second barrel (390) fits in its corresponding first gap (385), wherein the binding component (700) is slidably inserted and disposed through each first barrel channel (382) and each second barrel channel (392) to secure and retain the gripping wrap (300) on the handle (200);

wherein the gripping system (100) for the handle (200) is adapted to provide gripping stability and comfort to a user.

\* \* \* \* \*